United States Patent [19]
Bowley

[11] 3,846,990
[45] Nov. 12, 1974

[54] FLOATING WAVE BARRIER

[75] Inventor: Wallace William Bowley, Stafford Springs, Conn.

[73] Assignee: William Barney Ritchie, Jr., Duxbury, Mass. ; a part interest

[22] Filed: May 7, 1973

[21] Appl. No.: 357,938

Related U.S. Application Data

[63] Continuation-in-part of Ser. No. 267,086, June 28, 1972, abandoned.

[52] U.S. Cl. ..................................... 61/5
[51] Int. Cl. ............................... E02b 3/04
[58] Field of Search .......................... 61/1 F, 3, 4, 5

[56] References Cited
UNITED STATES PATENTS
| | | | |
|---|---|---|---|
| 3,022,632 | 2/1962 | Parks | 61/5 |
| 3,465,528 | 9/1969 | Usab | 61/5 |
| 3,487,645 | 1/1970 | Frankel | 61/3 |

FOREIGN PATENTS OR APPLICATIONS
| | | | |
|---|---|---|---|
| 1,163,173 | 9/1969 | Great Britain | 61/1 F |
| 1,267,953 | 6/1961 | France | 61/5 |
| 1,542,328 | 9/1968 | France | 61/3 |

Primary Examiner—Mervin Stein
Assistant Examiner—David H. Corbin
Attorney, Agent, or Firm—Kenway & Jenny

[57] ABSTRACT

A floating anchored wave barrier is provided comprising a plurality of plates, each having a relatively great horizontal extent compared to its thickness and connected by a flexible line. The buoyancy and mass of the plates are such that when the barrier is placed in water, the top plate is positioned at or near the water surface. The remaining plates are submerged but near the water surface so that they are located within the top portion of the wave where the major portion of the wave kinetic energy is encountered. The plates are relatively thin and move vertically within the water and out of phase with each other so that water between the plates is placed under a compressive force thereby reducing the vertical wave velocity component and accelerating the horizontal wave velocity component to form a reflected wave and a transmitted wave. The reflected wave reduces the kinetic energy of other incident waves and the transmitted wave fills in the wave trough of water past the barrier thereby reducing the vertical wave velocity component of the water in the trough.

14 Claims, 9 Drawing Figures

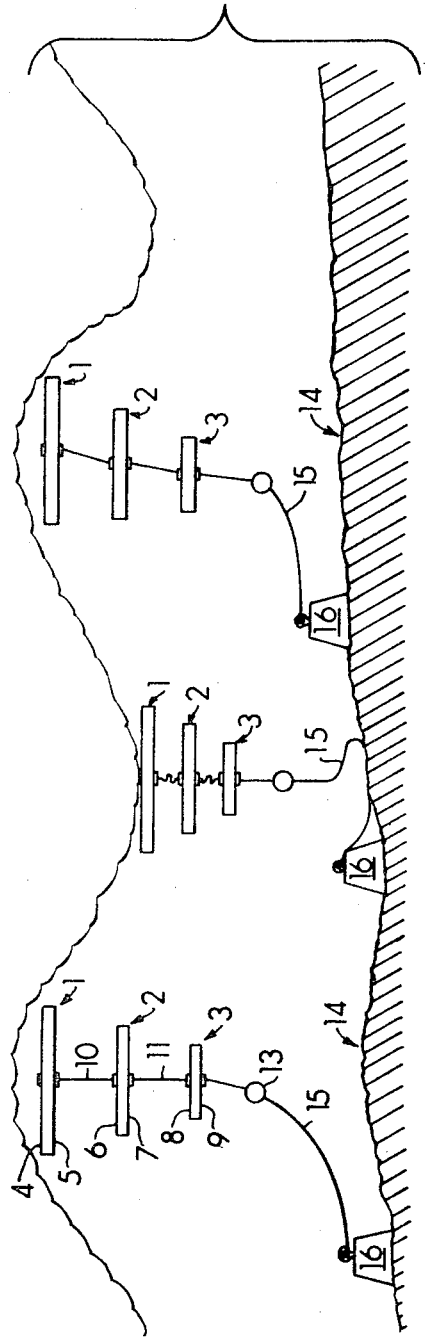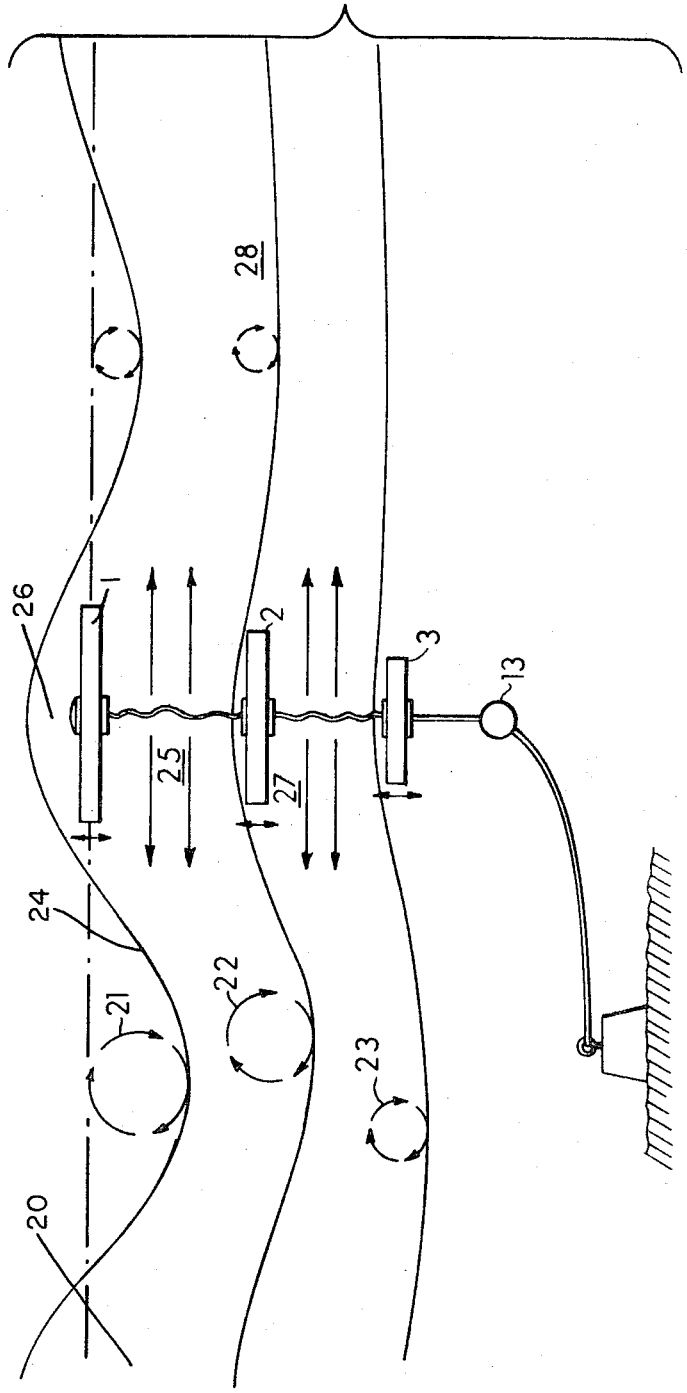

PATENTED NOV 12 1974 3,846,990

FLOATING WAVE BARRIER

REFERENCE TO RELATED APPLICATION

This application is a continuation-in-part of application Ser. No. 267,086, filed June 28, 1972, and now abandoned.

BACKGROUND OF THE INVENTION

This invention relates to an apparatus for forming a floating wave barrier for reducing or eliminating the kinetic energy of water waves.

Waves are generated at sea by virtue of the frictional drag exerted on the water surface by the wind whereby the small waves originally generated gradually build up to larger waves to form a pattern which progress towards the shore. It has been determined that the water particles making up the wave travel in a circular or elliptical orbit and that the diameter of the orbits at the water surface equal the height of the wave. Furthermore, it has been determined that the diameter of the orbit at a depth of about half the wave length is only about 4 percent of the orbital diameter at the water surface. Thus, substantially all of the kinetic energy of the wave is concentrated at or near the water surface and the percentage of wave kinetic energy located at a given water depth rapidly decreases with water depth. Thus, a water barrier located at or near the water surface and which extends toward the sea bottom a depth of about one-half the expected wave length can be highly effective in diminishing the wave kinetic energy.

In operation, the incident wave strikes the wave barrier which diminishes the kinetic energy of the wave by forming a reflected wave having a finite kinetic energy and allowing a transmitted wave to pass therethrough which has little kinetic energy. It is desirable that the reflected wave kinetic energy be maximized so that it impinges on other incident waves to decrease their kinetic energy prior to striking the wave barrier. The difference between the kinetic energy of the incident wave and the sum of the transmitted and reflected waves constitutes the kinetic energy absorbed by the wave barrier.

It has been proposed in U.S. Pat. No. 3,353,361 to employ a floating wave barrier comprising a plurality of weighted automobile tires attached with a flexible chain depending from a fixed support so that when placed in water the tires are located at different depths. This wave barrier is undesirable since it functions primarily to reduce the horizontal wave velocity component with little effect on the vertical wave velocity component. Since the net horizontal component is constantly directed landward, there is a constant substantial force on the fixed supports. In contrast, it would be desirable to provide a wave barrier which acts to reduce the vertical wave velocity component since the net vertical component is changing direction constantly and acts over a relatively short distance equal to about one-half the wave length so that the force exerted on the wave barrier anchor is reduced.

SUMMARY OF THE INVENTION

The present invention provides a floating wave barrier comprising a plurality of plate members each having a substantial portion of their surfaces relatively flat. They are connected with at least one flexible line and one member is connected to an anchor on the sea bottom so that when the barrier is placed in water, the plate members are positioned at different vertical levels with the top member being at or near the surface of the water. The remaining members are submerged but near the water surface so that they are located within the top portion of the wave where the major portion of the wave kinetic energy is encountered. When placed in water, the plate members are fixed to prevent substantial movement in the horizontal direction but are free to move in a vertical direction within the wave with the vertical movement of each plate member being out of phase with the other plate members.

Since the plate members are relatively thin, they do not present a substantial fixed force against the horizontal component of the wave velocity. However, when the out-of-phase plate movement causes two plates to move toward each other, the water between them is placed under a compressive force in the vertical direction which force is generated from the plates' acceleration and the masses of the plate and the water above the downwardly moving plate and the water below the upwardly moving plate. This causes the water between the plates to be accelerated horizontally to form a reflected wave in the seaward direction and a transmitted wave in the landward direction. The reflected wave contacts other incoming incident waves to reduce their kinetic energy prior to contacting the barrier and the transmitted wave tends to fill up the wave trough directly preceeding it to reduce the vertical force component of the water therein. A plurality of these barriers are arranged substantially parallel to the shore being protected at varying distances from the shore so that a given portion of the wave contacts more than one barrier prior to reaching the shore.

BRIEF DESCRIPTION OF THE DRAWINGS

The present invention will be described more fully with reference to the accompanying drawings.

FIG. 1 is a vertical cross-sectional view showing a barrier of this invention in place.

FIG. 3 is a side view of the apparatus of this invention illustrating the mechanics involved in its use.

DESCRIPTION OF SPECIFIC EMBODIMENTS

Figure 2A:
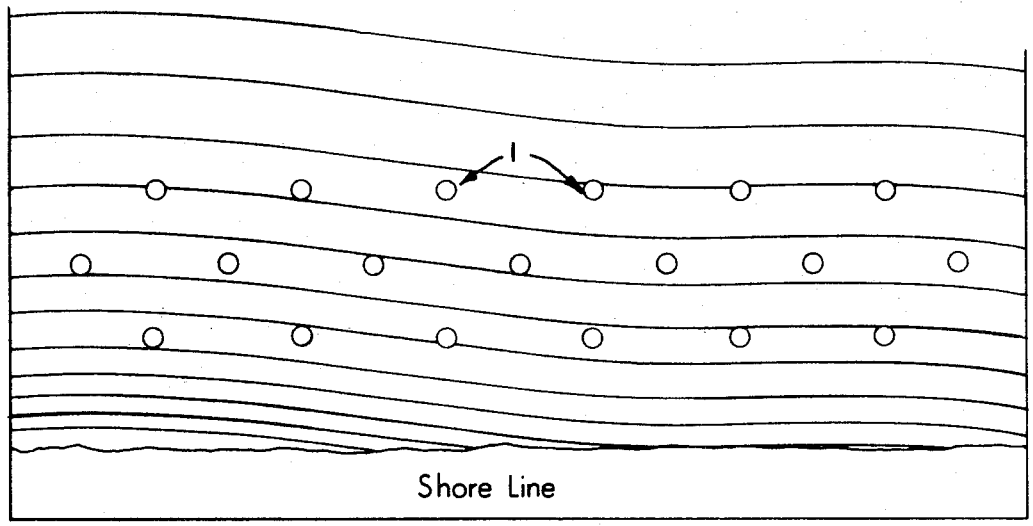
FIGS. 2a, 2b and 2c are top views of alternative configurations for arranging the wave barriers of this invention.

The embodiment shown in the figures comprises a plurality of disks 1, 2 and 3, each having a generally rectangular cross section and two circular horizontal flat surfaces, respectively 4 and 5, 6 and 7, and 8 and 9. The disks 1, 2 and 3 are joined by flexible lines 10 and 11 for example a rope or chain. The counterweight 13 is employed to reduce the horizontal force component of the anchor 16 on the disks 1, 2 and 3 and thereby maintain the disks in the desired vertical configuration. The counterweight 13 is not required and it can be located anywhere along the flexible line connecting the anchor and disk 5. The average specific gravity of the disks 1, 2 and 3 as well as the counterweight 13 is such as to permit the disks and counterweight to remain at or near the water surface when submerged. Furthermore, the masses and specific gravity of each disk 1, 2 and 3 are controlled so that they are maintained generally along a common vertical axis with respect to each other while submerged. The barrier is anchored to the sea bottom 14 by means of a line 15 and an anchor 16. As shown, the distance between the top surface 4 of disk 1 in the bottom surface 9 of disk 3 is about one-half the wave length of the expected waves. This distance can be longer or shorter as desired. However, as noted above, approximately 96 percent of the kinetic energy of the wave is located within this distance.

Figure 2B:
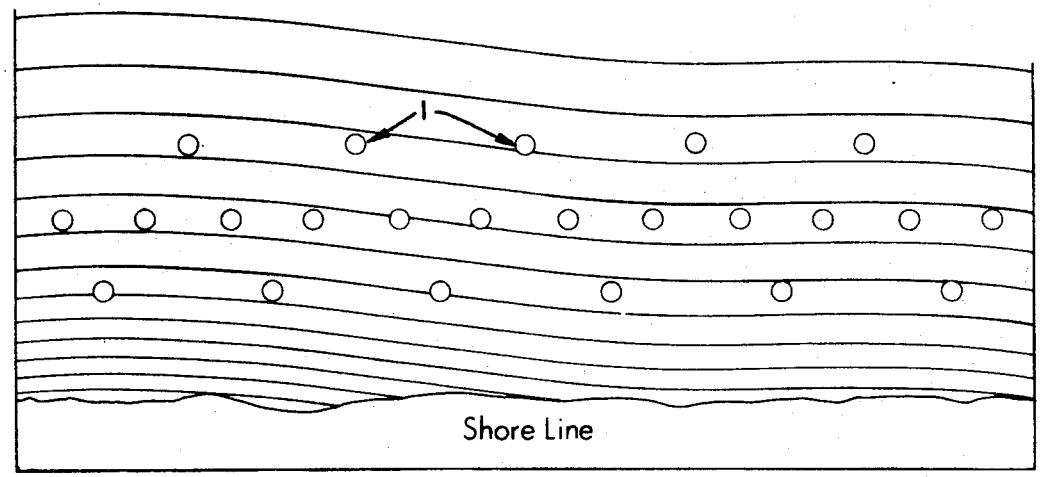
Figure 2C:
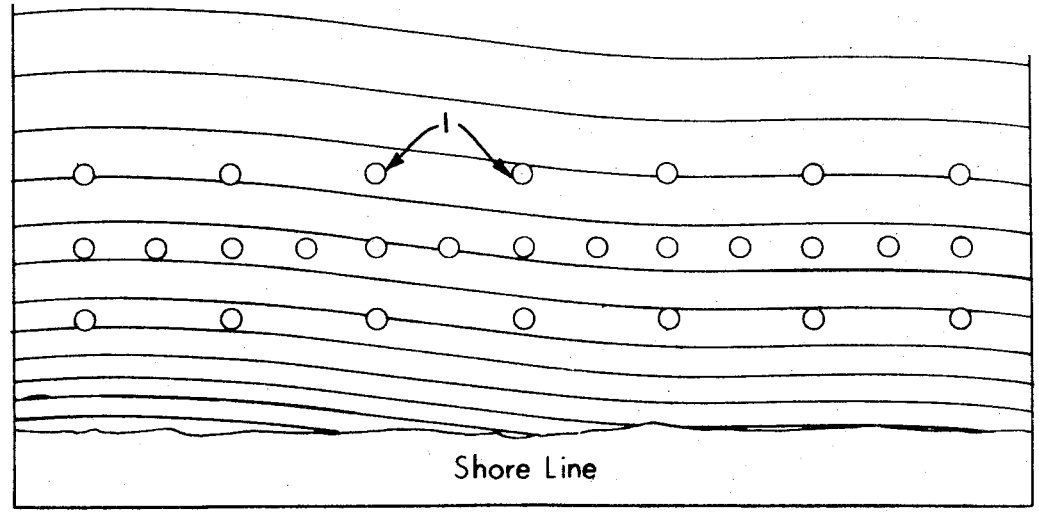

Suitable alternative configurations for placing the barrier in the water are shown in FIGS. 2a, 2b, and 2c and have a common object of providing effective wave dampening along a desired length of shoreline so that substantially all of the wave kinetic energy located near or at the water surface is eliminated. The barriers are placed a suitable distance from the shore line so that they contact deep water waves but not so far as to allow the dampened waves to build up kinetic energy prior to reaching the shore. To attain relatively complete wave dampening, the barriers are placed within about three diameters of the largest disk from each other. A particularly suitable means for maintaining the desired barrier configuration is to anchor a net to the sea bottom to which the barriers can be anchored.

Referring to FIG. 3, the kinetic energy and circular orbits of the water particles in the wave 20 are represented by the circles 21 and 22 and 23 with circle 21 having the largest diameter since the particles have a greater kinetic energy nearer the surface 24 of the wave 20. The disks 1, 2 and 3 move vertically by virtue of their contact with waves prior to wave 20. This motion generally is along a common vertical axis and is such that the motion of the disks 1, 2 and 3 is out of phase so that at any given time, two adjacent disks are moving either toward each other or away from each other. This motion serves to dampen the vertical velocity component by two mechanisms. One mechanism is described conveniently with reference to disk 2. During at least a portion of the time that disk 2 is rising, disk 1 is falling. When disk 2 rises, it causes the water 25 between it and disk 1 to move upward and contact the downwardly moving disk 1. Since the force of the rising water 25 acts against the force of the downwardly moving disk 1 and the water 26 above disk 1, the vertical component of the water 25 is reduced. Similarly, disk 3 is rising during at least a portion of the time that disk 2 is falling and the vertical component of the water 27 between the disks 2 and 3 is dampened in the same manner.

The second and most important mechanism by which the vertical velocity component is dampened results from the compression force exerted by two adjacent disks on the water therebetween to accelerate the water in a horizontal direction either landward or seaward. The water directed seaward forms a reflecting wave which impinges upon incoming waves thereby reducing the kinetic energy of the incoming wave. The water accelerated in a horizontal direction toward the shore tends to fill up the trough portion of water already transmitted past the floating barrier thereby to reduce the vertical velocity component of the water 28 past the floating barrier which is about to rise.

The mass and buoyancy of the individual plate members are controlled to maintain the generally vertical spaced-apart relationships and the vertical movement of each plate in water described above. In addition, the plates are spaced apart along the flexible line a distance so that they do not contact during use but are sufficiently close to effect dampening of the vertical wave component by the mechanisms described above. For example, in areas where 4 to 5 foot water waves are expected, the plate members are spaced apart a distance of about 2 to 3 feet. In smaller waves, the distance between plates is less than 2 to 3 feet and in larger waves the distance is greater than 2 to 3 feet. The distance between plates for a given set of expected wave conditions and plate buoyancy and mass can be determined easily by calculating the forces on the plates and the forces exerted by the moving plates.

It is to be understood that the plates can be of the same size or different sizes. It is preferred that the plate nearest the surface be the largest and the bottom plate be the smallest with the intervening plates gradually being smaller as a function of water depth because the plates at the lower depths encounter a reduced portion of the wave kinetic energy as compared to the plates at or near the surface and the cost of increasing their size generally is not justified. In addition, it is preferred that the anchor be attached to the bottom plate since it encounters a smaller portion of the wave kinetic energy and the adverse effect on wave dampening caused by the attendent restriction on the plate vertical movement thereby is minimized. The ratio of disk major effective diameter to disk thickness should be at least about 10 to 1 to attain effective wave dampening. Two or more disks should be employed with three or four being preferred. Each disk can be modified to position the center of gravity thereof as desired. Thus, the periphery on either surface of the disk can be formed of a material having a different density than the average density of the disk. It has been found desirable to form the periphery of the disk from a material having a higher density than the average disk density thereby to increase the mass at the periphery, increase the moment of inertia of the disk and increase its vertical movement in a wave.

Figure 4:
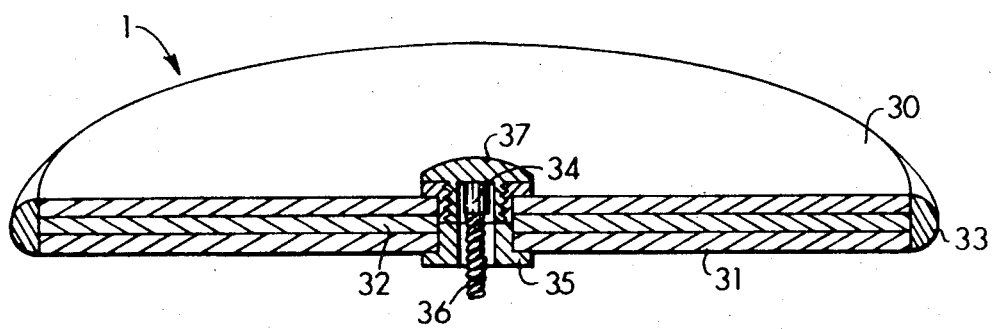
FIG. 4 is an isometric cross-sectional view of one type of plate member employed in the apparatus of this invention.

An example of a plate member which can be employed in the apparatus of this invention is shown in FIG. 4. The disk 1 comprises two layers of a foam material 30 and 31 such as polyurethene and has a radially extending strengthening means 32 which can be either in the form of separated ribs or can comprise a plate having continuous surfaces. A strengthening member 33 surrounds the disk which can be made of any suitable material such as a metal. A central opening 34 is formed by a circular flange 35 which is adhered to the laminate at its center. A line 36 is attached to a head 37 which is adhered to the circular flange 35 and the line 37 extends downwardly to the next adjacent disk for attachment thereto.

Figure 5:
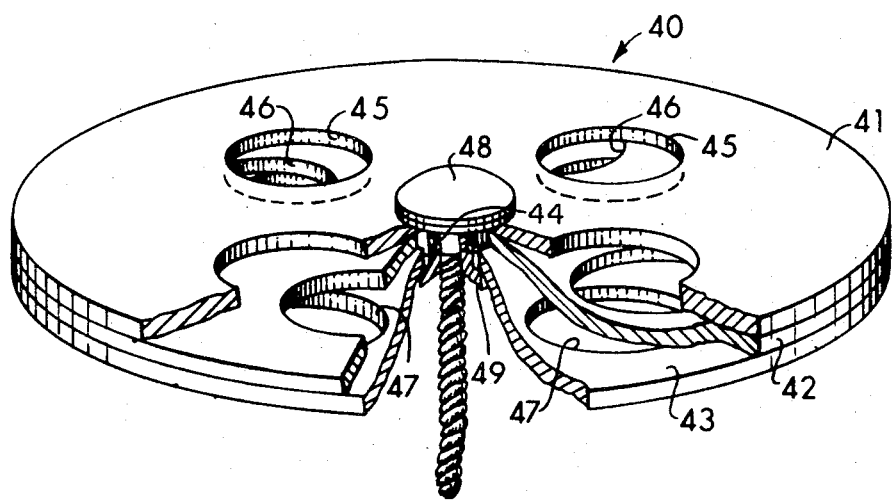
FIG. 5 is an isometric cross-sectional view of a preferred type of plate member employed in the apparatus of this invention.

A further example of a plate member, which is adjustable to change the effective diameter thereof is shown in FIG. 5. The disk 40 is formed from three plate members 41, 42 and 43. Each plate member 41, 42 and 43 is pivotable on the flanged member 44 and each plate member has holes therein so that the surface area of plate 40 can be adjusted by varying the alignment of holes 45 on plate 41, holes 46 on plate 4 and holes 47 on plate 43. After the plate members 41, 42 and 43 have been pivoted to the desired position head 48 is fit into the flanged member 44 so that its bottom surface contacts the top surface of plate 44 and a compressive force is exerted in the plates 41, 42 and 43 by head 48 and flange 49 thereby retaining the plates in the desired configuration.

Figure 6:
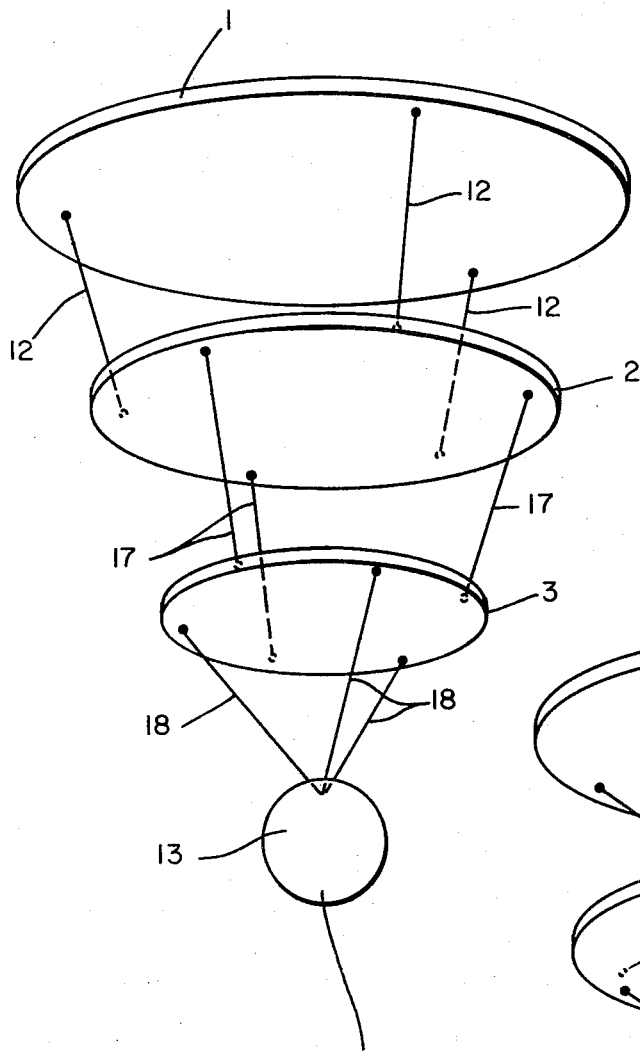
FIG. 6 is an isometric view of an alternative embodiment employing a plurality of flexible connecting lines.

Referring to FIG. 6, a plurality of disks 1, 2 and 3 are attached to each other with a plurality of flexible lines. The lines 12 are attached at or near the periphery of the bottom surface of disk 1 and the top surface of disk 2. Lines 17 are attached at or near the periphery of the bottom surface of disk 2 and the top surface of disk 3. Similarly, lines 18 are attached to the bottom surface of disk 3 and to the counterweight 13. The points of attachment of lines 12 and lines 17 to the respective disks 1, 2 and 3 are equally spaced about the periphery of the disks so that when employing three lines, for example, they are spaced 120° apart. The points of attachment of the lines 12, 17 and 18 about the periphery of the disks 1, 2 and 3 are not critical. Thus, as shown in FIG. 6, the points of attachment of lines 17 to the bottom surface of disk 2 are diametrically opposed to each point of attachment of lines 12 to the top surface of disk 3. If desired, the points of attachment of lines 12 and 17 can be at the same peripheral position of disk 2.

Figure 7:
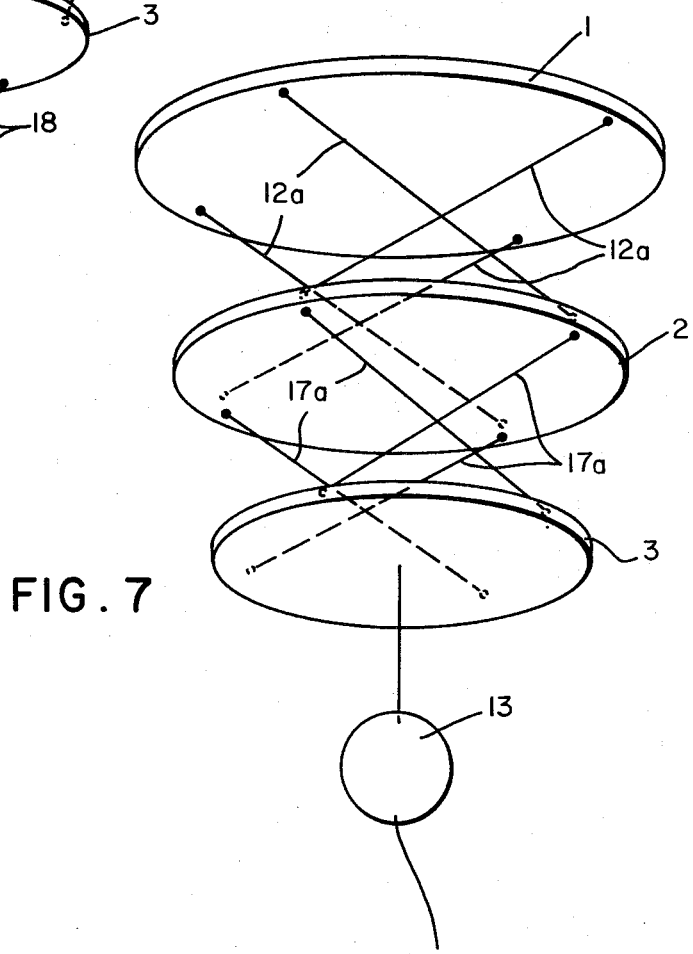
FIG. 7 is an isometric view of a wave barrier having a plurality of flexible connecting lines.

An alternative arrangement is shown in FIG. 7, wherein four lines 12a and 17a are employed to attach disks 1, 2 and 3 in a configuration so that each line extends between opposing peripheral positions of adjacent disks.

It is to be understood that the disk configuration shown in the drawings is only representative of a large number of configurations that can be employed. All that is needed is that the plate have two surfaces which have a relatively great horizontal extent compared to its thickness to obtain the desired effect; namely, the "squeezing" effect noted above on the water between the disks and to prevent substantial bypass of water around the plate in a vertical direction while the plate is moving vertically. Thus, the disk surfaces can be flat, slightly concave, slightly convex, corrugated, etc., and still prevent substantial undesirable water by-pass. In addition, these surfaces need not be circular but can be elliptical, polygonal etc.

I claim:

1. A wave barrier comprising a plurality of buoyant substantially flat disk members each member being of relatively great horizontal extent compared to its thickness, said members being connected with flexible line and anchored in a configuration such that when placed in water, the members are located at different vertical levels along a common vertical axis, the mass and buoyancy of said members and the distance between said members being such as to provide vertical, out of phase motion of said members to exert a compression force on water between said members to reduce a vertical wave velocity component and increase a horizontal wave velocity component in both a landward and seaward direction without substantial contact of said members.

2. The wave barrier of claim 1 wherein the distance between the top surface of the top buoyant member and the bottom surface of the lowermost buoyant member is about one-half the wave length of normal waves in which the barrier is positioned.

3. The wave barrier of claim 1 having three buoyant members.

4. The wave barrier of claim 2 having three buoyant members.

5. The wave barrier of claim 1 wherein the lowermost buoyant member is attached to an anchor with a flexible line.

6. The wave barrier of claim 5 having a weight attached to the lowermost buoyant member with a flexible line and attached to an anchor to reduce a horizontal force component on said lowermost buoyant member exerted by said anchor.

7. Apparatus for reducing or eliminating the vertical kinetic energy component of water waves on a shore line comprising a plurality of the wave barriers of claim 1 positioned substantially parallel to the shore line at different distances from the shore line so that a given portion of an incident water wave contacts at least two of said barriers.

8. Apparatus for reducing or eliminating the vertical kinetic energy component of water waves on a shore line comprising a plurality of the wave barriers of claim 2 positioned substantially parallel to the shore line and a different distance from the shore line so that a given portion of an incident water wave contacts at least two of said barriers.

9. The apparatus of claim 7 wherein said barriers are anchored to a net located on and secured to the sea bottom.

10. The apparatus of claim 8 wherein said barriers are anchored to a net located on and secured to the sea bottom.

11. The wave barrier of claim 1 wherein each member has a peripheral surface, adjacently positioned members are connected to each other with a plurality of flexible lines and said flexible lines are connected to said members adjacent the peripheral surface of each member.

12. The wave barrier of claim 2 wherein each member has a peripheral surface, adjacently positioned members are connected to each other with a plurality of flexible lines and said flexible lines are connected to said members adjacent the peripheral surface of each member.

13. Apparatus for reducing or eliminating the vertical kinetic energy component of water waves on a shore line comprising a plurality of the wave barriers of claim 11 positioned substantially parallel to the shore line at different distances from the shore line so that a given portion of an incident water wave contacts at least two of said barriers.

14. The apparatus of claim 13 wherein said barriers are anchored to a net secured to the sea bottom.

* * * * *